(12) United States Patent
Crowhurst

(10) Patent No.: US 11,867,658 B2
(45) Date of Patent: Jan. 9, 2024

(54) FURNACE OXYGEN PROBE

(71) Applicant: CERAMIC OXIDE FABRICATORS PTY LTD, California Gully (AU)

(72) Inventor: Peter Crowhurst, California Gully (AU)

(73) Assignee: Ceramic Oxide Fabricators Pty Ltd, California Gully (AU)

( * ) Notice: Subject to any disclaimer, the term of this patent is extended or adjusted under 35 U.S.C. 154(b) by 267 days.

(21) Appl. No.: 17/267,177

(22) PCT Filed: Aug. 9, 2019

(86) PCT No.: PCT/AU2019/050836
§ 371 (c)(1),
(2) Date: Feb. 9, 2021

(87) PCT Pub. No.: WO2020/028956
PCT Pub. Date: Feb. 13, 2020

(65) Prior Publication Data
US 2021/0302361 A1   Sep. 30, 2021

(30) Foreign Application Priority Data

Aug. 10, 2018 (AU) ............................. 2018902921

(51) Int. Cl.
*G01N 27/407* (2006.01)
*F16J 15/32* (2016.01)

(52) U.S. Cl.
CPC ......... *G01N 27/4078* (2013.01); *F16J 15/32* (2013.01)

(58) Field of Classification Search
CPC ...... G01N 27/4078; F16J 15/32; F23N 3/002; F23N 5/006; H01R 13/2421
See application file for complete search history.

(56) References Cited

U.S. PATENT DOCUMENTS

| | | | |
|---|---|---|---|
| 4,193,857 A | | 3/1980 | Bannister et al. |
| 4,462,872 A | * | 7/1984 | Nelson ............... G01N 27/4078 204/427 |
| 6,093,295 A | | 7/2000 | Zhuiykov et al. |
| 6,423,387 B1 | * | 7/2002 | Zollinger ........... A61K 49/1815 220/592.2 |
| 2010/0236925 A1 | | 9/2010 | Uchikawa et al. |
| 2014/0105249 A1 | | 4/2014 | Yasutomi et al. |

(Continued)

OTHER PUBLICATIONS

International Search Report on corresponding PCT application (PCT/AU2019/050836) from International Searching Authority (Australian Patent Office) dated Nov. 13, 2019.

(Continued)

*Primary Examiner* — Peter J Macchiarolo
*Assistant Examiner* — John M Royston
(74) *Attorney, Agent, or Firm* — Shore IP Group, PLLC; Howard J. Klein

(57) ABSTRACT

The present invention relates to an oxygen probe for a furnace. The oxygen probe includes an elongate outer conductor and an inner conductor within the outer conductor. An oxygen sensor is in electrical connection with the outer conductor and the inner conductor. The oxygen probe further includes a seal arrangement for receiving the inner conductor and maintaining a seal to a reference chamber during movement of the conductors owing to heat from the furnace.

18 Claims, 2 Drawing Sheets

(56) References Cited

U.S. PATENT DOCUMENTS

| | | | |
|---|---|---|---|
| 2016/0223504 A1* | 8/2016 | Yonezu | G01N 27/4077 |
| 2016/0256466 A1* | 9/2016 | Amour | A61P 31/00 |
| 2019/0270034 A1* | 9/2019 | Ward | B01D 15/22 |
| 2021/0215281 A1* | 7/2021 | Massey | F16L 19/0206 |

OTHER PUBLICATIONS

Written Opinion on corresponding PCT application (PCT/AU2019/050836) from International Searching Authority (Australian Patent Office) dated Nov. 13, 2019.

Extended European Search Report on corresponding foreign application from the European Patent Office dated Mar. 21, 2022.

* cited by examiner

FURNACE OXYGEN PROBE

CROSS-REFERENCE TO RELATED APPLICATION

This application is the National Phase, under 35 U.S.C. § 371(c), of International Application No. PCT/AU2019/050836, filed Aug. 9, 2019, which claims priority from Australian Application No. AU 2018902921, filed Aug. 10, 2018. The disclosures of all of the referenced applications are incorporated herein by reference in their entirety.

FEDERALLY SPONSORED RESEARCH OR DEVELOPMENT

Not Applicable

TECHNICAL FIELD

The present invention generally relates to an oxygen probe for a furnace.

BACKGROUND

The reference to any prior art in this specification is not, and should not be taken as an acknowledgement or any form of suggestion that the prior art forms part of the common general knowledge.

Oxygen probes are used to sense oxygen in a furnace or kiln. A known sensor has an oxygen sensor coupled between an inner conductor for a reference signal and high quality steel for the return electrical path.

To ensure continued probe operation over temperature, ambient to 1100° C., attention must be paid to the stainless steel expansion coefficient. Critical to the performance of the probe is the continued electrical contact between the sensor and the stainless steel conductor. Owing to the operating temperatures of the furnace, typically 10 mm (for short probes) of expansion occurs with the steel, and so the sensor must track this length and continue to make contact so the sensing can continue.

To support continued electrical contact, a spring is used to apply pressure on the sensor, translating through to the tip of the sensor against the internal end of the stainless steel sheath. Accordingly, the sensor moves to maintaining contact, and a Teflon compression seal is typically used to provide a gas tight interface allowing a controlled reference atmosphere.

However, in practice, a Teflon seal would regularly lock with a small amount of hand tightening of a purge air bolt or stainless steel tubing. In effect, either too much pressure is to be applied by the compression spring, thereby fracturing the end of the sensor causing reference air leakage, or not enough pressure thereby breaking electrical contact. In any event, Teflon seals have proven to be unreliable.

The preferred embodiment provides an improved oxygen probe with a new design for the gas tight seal.

SUMMARY OF THE INVENTION

According to one aspect of the present invention, there is provided an oxygen probe for a furnace, the oxygen probe including:
    an elongate outer conductor;
    an inner conductor within the outer conductor;
    an oxygen sensor in electrical connection with the outer conductor and the inner conductor; and
    a seal arrangement for receiving the inner conductor and maintaining a seal to a reference chamber during movement of the conductors owing to heat from the furnace.

The seal arrangement may maintain a seal between the reference chamber and the purge chamber. The seal arrangement may further maintain a seal between the purge chamber and a sensor chamber.

Preferably, the seal arrangement may include a seal formed from an elastomer or synthetic rubber copolymer. The seal may be a co-polymer of acrylonitrile and a diene, especially butadiene. The seal may not include Teflon. Even more preferably, the seal may include nitrile material. The seal may include a head from which a tail extends. The head may be flanged. The tail may be ribbed. The seal arrangement may include a pair of abutments against the head. Each abutment may be a brass ring. The seal arrangement may be tubular to allow passage of the inner conductor. The seal arrangement may include an O-ring.

The seal arrangement may provide a gas tight seal of up to 2 atmospheres.

The probe may further include a biasing means for biasing the oxygen sensor in contact with the inner conductor. The biasing means may include one or more springs.

The probe may further include a reference port to the reference chamber. The probe may include a head defining the reference chamber. The outer conductor may define one or more lateral apertures in register with the oxygen sensor. The probe may further include a purge port in register with the seal arrangement.

The oxygen sensor may include a ceramic oxygen sensor. The oxygen sensor may be interlocked with an end of the outer conductor.

According to another aspect of the present invention, there is provided an oxygen probe for a furnace, the oxygen probe including:
    an inner conductor;
    an oxygen sensor in electrical connection with the inner conductor; and
    a seal arrangement for receiving the inner conductor and maintaining a seal to a reference chamber during movement of the inner conductor owing to heat from the furnace.

According to another aspect of the present invention, there is provided a seal arrangement of an oxygen probe for a furnace, the seal arrangement including a seal.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1a is a front view of a furnace oxygen probe in accordance with an embodiment of the present invention;
FIG. 1b is a sectional view through the line A-A in FIG. 1a;
FIG. 1c is a detail view of detail B in FIG. 1b;
FIG. 1d is a detail view of detail C in FIG. 1b;
FIG. 1e is a detail view of detail D in FIG. 1b;

FIG. 2a is a side view of the furnace oxygen probe of FIG. 1a;

FIG. 2b is a sectional view through the line A-A in FIG. 2a; and

FIG. 2c is a detail view of detail B in FIG. 2b.

DETAILED DESCRIPTION OF PREFERRED EMBODIMENTS

Figure 1:
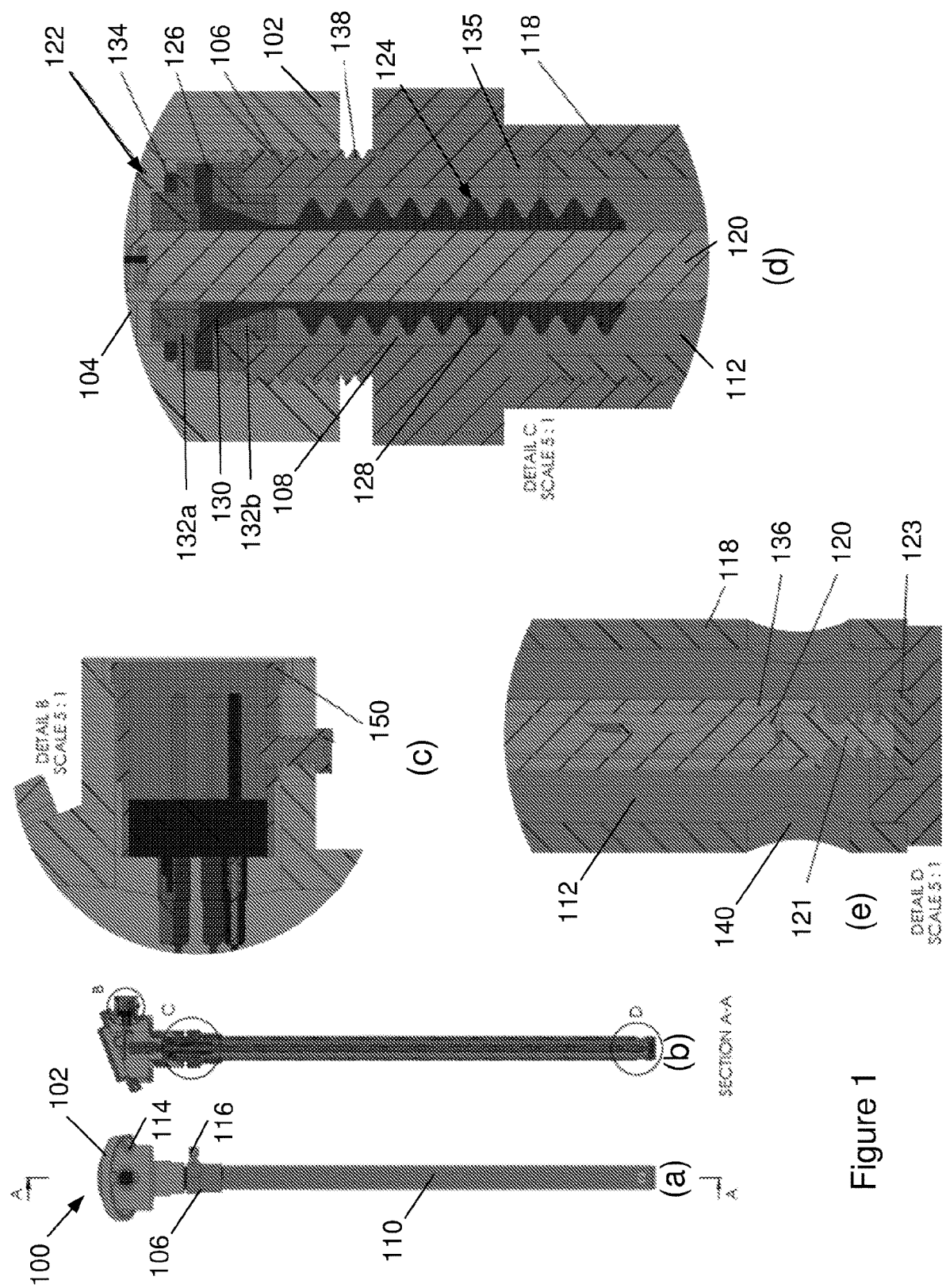

According to an embodiment of the present invention, there is provided an oxygen probe 100 for a furnace as shown in FIG. 1. The probe 100 includes a head 102 defining an internal reference chamber 104, an intermediate purge body 106 defining an internal purge chamber 108, and a sensor tail 110 defining an internal sensor chamber 112. The probe 100 includes a reference port 114 in communication with the reference chamber 104 and a purge port 116 in communication with the purge chamber 108.

The oxygen probe 100 includes an elongate stainless-steel outer conductor 118, and an inner conductor 120 within the outer conductor 118. A ceramic oxygen sensor 121 is fixed within the sensing chamber 112 and is maintained in electrical connection with the outer conductor 118 and the inner conductor 120 as the probe 100 is heated by the furnace. The oxygen sensor 121 is interlocked within an end 123 of the outer conductor 118.

A seal arrangement 122 receives the inner conductor 120 and maintains a seal to the reference chamber 104 during expansion movement of the outer conductor 118 and translational movement of the inner conductor 120 when heated by the furnace. The seal arrangement 122 maintains a gas tight seal between the reference chamber 104 and the purge chamber 108. The seal arrangement 122 further maintains a gas tight seal between the purge chamber 108 and the sensor chamber 112.

The seal arrangement 122 is tubular to allow passage of the inner conductor 120 and provides a gas tight seal of up to 2 atmospheres. The seal arrangement 122 includes an elongate ribbed boot seal 124 which does not include Teflon. Instead, the boot seal 124 is integrally formed from an elastomer or synthetic rubber copolymer, and a co-polymer of acrylonitrile and a diene, especially butadiene. In particular, the boot seal 124 is formed from nitrile material, and is far improved over the prior art Teflon seal, allowing for movement of the sensor 121 without damage.

The boot seal 124 includes a flanged head 126 from which a ribbed tail 128 extends. The seal 124 further includes an intermediate tapered body 130. The seal arrangement 122 further includes a pair of brass abutments 132a, 132b against the head 126. Each abutment 132 is a stepped brass ring. The seal arrangement 122 also includes an upper sealing O-ring 134.

The purge body 106 threadably engages with both the outer conductor 118 of the tail 110 and the probe head 102. An annular partition 135 partitions the purge chamber 108 and the sensor chamber 112 whilst receiving the resilient boot seal 124. A purge cavity 138 is defined between the purge body 106 and the probe head 102 to receive the purge port 116 in register with the seal arrangement 122. The insulated inner conductor 120 includes outer protective insulation 136. The outer conductor 118 also defines lateral intake apertures 140 in register with the oxygen sensor 121.

Figure 2:
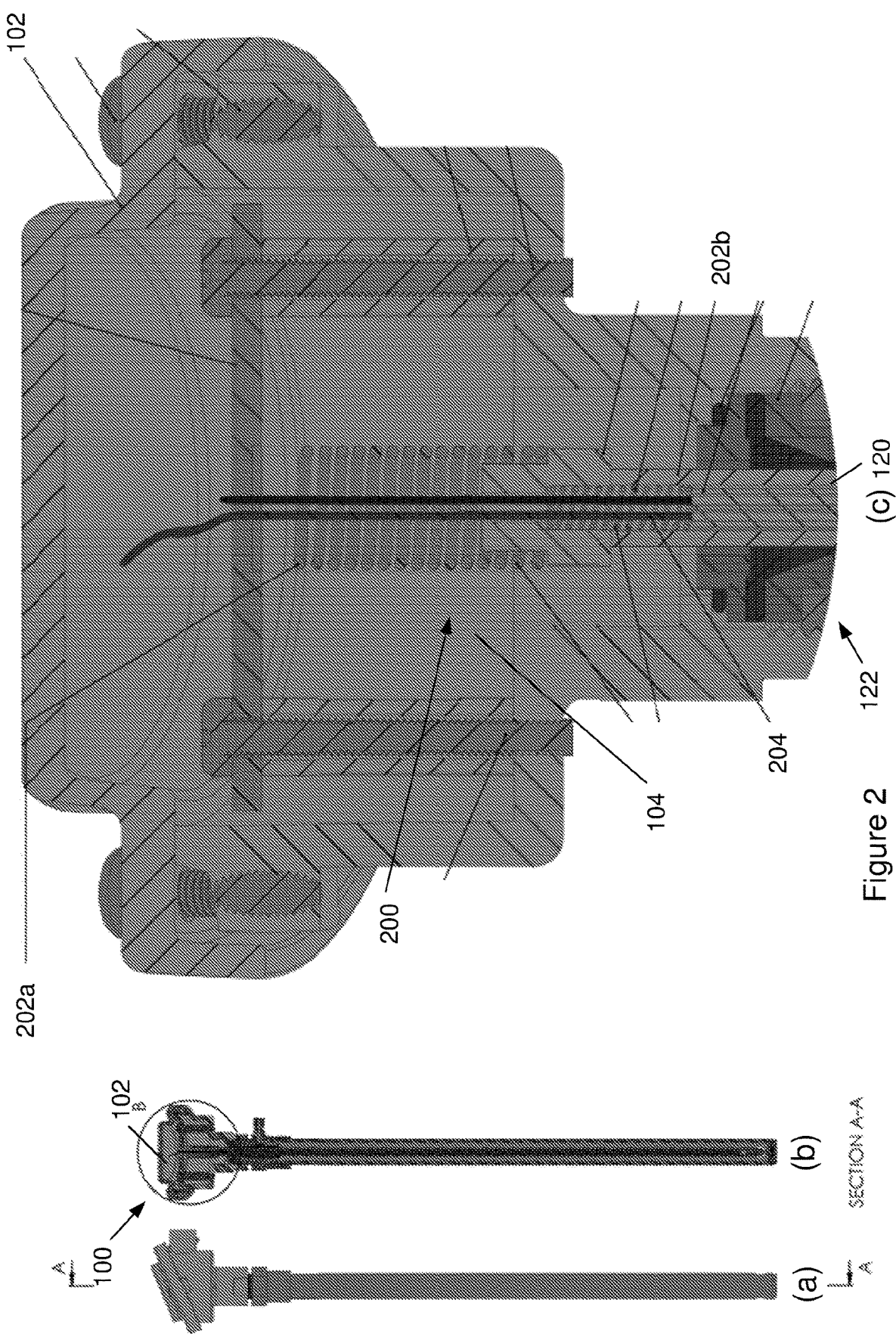

Turning to FIG. 2, the probe 100 further includes a biasing means 200 for biasing the oxygen sensor 121 to maintain contact with the inner conductor 120 as the outer conductor 118 expands. The biasing means 200 includes a pair of compression springs 202a, 202b. Wires 204 are coupled between the inner conductor 120 and an electrical connector 150 (FIG. 1c).

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An oxygen probe for a furnace, the oxygen probe including:
   an elongate outer conductor;
   an inner conductor within the outer conductor;
   an oxygen sensor in electrical connection with the outer conductor and the inner conductor; and
   a seal arrangement configured for receiving the inner conductor and for maintaining a seal to a reference chamber during movement of the inner conductor and the outer conductor owing to heat from the furnace;
   wherein the seal arrangement includes an elongate, tubular seal formed from one of an elastomer and a synthetic rubber copolymer, the elongate, tubular seal being including a head from which a tail extends, the tail disposed about and extending along the inner conductor and into a sensor chamber.

2. An oxygen probe as claimed in claim 1, wherein the seal arrangement is configured to maintain a seal between the reference chamber and a purge chamber.

3. An oxygen probe as claimed in claim 2, wherein the seal arrangement is configured to maintain a seal between the purge chamber and the sensor chamber.

4. An oxygen probe as claimed in claim 1, wherein the elongate, tubular seal is formed from a synthetic rubber copolymer that is a copolymer of acrylonitrile and a diene.

5. An oxygen probe as claimed in claim 1, wherein the elongate, tubular seal is formed from a polymeric material that does not include polytetrafluoroethylene.

6. An oxygen probe as claimed in claim 1 wherein the elongate, tubular seal includes nitrile material.

7. An oxygen probe as claimed in claim 1, wherein the head is flanged.

8. An oxygen probe as claimed in claim 1, wherein the tail is ribbed.

9. An oxygen probe as claimed in claim 1, wherein the seal includes a pair of abutments against the head.

10. An oxygen probe as claimed in claim 9, wherein each abutment includes a brass ring.

11. An oxygen probe as claimed in claim 1, wherein the elongate, tubular seal is configured to allow passage therethrough of the inner conductor.

12. An oxygen probe as claimed in claim 1, wherein the seal arrangement includes an O-ring that provides a gas tight seal of up to 2 atmospheres.

13. An oxygen probe as claimed in claim 1, further including a biasing means for biasing the oxygen sensor in contact with the inner conductor, the biasing means including one or more springs.

14. An oxygen probe as claimed in claim 1, further including at least one of a reference port to the reference chamber and a purge port in register with the seal arrangement.

15. An oxygen probe as claimed in claim 1, further including a head defining the reference chamber.

16. An oxygen probe as claimed in claim 1, wherein the outer conductor defines one or more lateral apertures in register with the oxygen sensor.

17. An oxygen probe as claimed in claim 1, wherein the oxygen sensor is interlocked with an end of the outer conductor.

18. An oxygen probe for a furnace, the oxygen probe including:
- an inner conductor;
- an oxygen sensor in electrical connection with the inner conductor; and
- a seal arrangement configured for receiving the inner conductor and for maintaining a seal to a reference chamber during movement of the inner conductor owing to heat from the furnace;
- wherein the seal arrangement includes an elongate, tubular seal formed from one of an elastomer and a synthetic rubber copolymer, the elongate, tubular seal including a head from which a tail extends, the tail disposed about and extending along the inner conductor and into a sensor chamber.

\* \* \* \* \*